US006771654B1

(12) United States Patent
Sang et al.

(10) Patent No.: US 6,771,654 B1
(45) Date of Patent: Aug. 3, 2004

(54) APPARATUS AND METHOD FOR SHARING MEMORY USING A SINGLE RING DATA BUS CONNECTION CONFIGURATION

(75) Inventors: Jinqlih (Charlie) Sang, Fremont, CA (US); Shashank Merchant, Sunnyvale, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/562,924

(22) Filed: May 2, 2000

Related U.S. Application Data

(60) Provisional application No. 60/177,345, filed on Jan. 24, 2000.

(51) Int. Cl.[7] ................................................ H04L 12/54
(52) U.S. Cl. ...................... 370/429; 370/376; 370/473
(58) Field of Search ................................ 370/232, 236, 370/389, 428, 386, 432, 412–418, 419–421, 376, 473, 429; 709/251

(56) References Cited

U.S. PATENT DOCUMENTS

| | | | | |
|---|---|---|---|---|
| 5,226,039 A | | 7/1993 | Frank et al. ................. 370/405 |
| 5,469,438 A | * | 11/1995 | Baumert et al. ............. 370/432 |
| 5,870,566 A | * | 2/1999 | Joh .............................. 709/251 |
| 6,052,751 A | * | 4/2000 | Runaldue et al. ............ 710/107 |
| 6,501,734 B1 | * | 12/2002 | Merchant et al. ............ 370/236 |
| 6,546,010 B1 | * | 4/2003 | Merchant et al. ............ 370/389 |
| 6,553,027 B1 | * | 4/2003 | Lam et al. .................... 370/386 |
| 6,574,231 B1 | * | 6/2003 | Leung .......................... 370/412 |
| 6,667,973 B1 | * | 12/2003 | Gorshe et al. ............... 370/376 |

FOREIGN PATENT DOCUMENTS

WO     WO 99/39478     8/1999

* cited by examiner

*Primary Examiner*—John Pezzlo

(57) ABSTRACT

Multiple network switches are configured having memory interfaces that transfer segmented packet data to each other via a unidirectional data bus ring connecting the network switches in a single ring or "daisy chain" arrangement. The memory interfaces are also configured for transferring the segmented packet data to respective local buffer memories for temporary storage. The memory interfaces transfer the data units according to a prescribed sequence, optimizing memory bandwidth by requiring only one read and one write operation to and from the local buffer memory for each segmented packet data being received and transmitted through the switches.

12 Claims, 5 Drawing Sheets

APPARATUS AND METHOD FOR SHARING MEMORY USING A SINGLE RING DATA BUS CONNECTION CONFIGURATION

RELATED APPLICATIONS

This application contains subject matter related to the subject matter disclosed in copending U.S. Provisional Patent Application Serial No. 60/177,345, filed on Jan. 24, 2000.

FIELD OF THE INVENTION

The present invention relates to computer network interfacing and switching, and more particularly, to an apparatus and method for efficiently storing and forwarding data frames within a "daisy chain" configuration of multiple multiport network switches.

BACKGROUND ART

A multiport network switch in a packet switching network is coupled to stations on the network through its multiple ports. Data sent by one station on the network to one or more other stations on the network are sent through the network switch. The data is provided to the network switch over a shared access medium according to, for example, an Ethernet protocol (IEEE Std. 802.3). The network switch, which receives a data frame at one of its multiple ports, determines a destination network station for the data frame from information contained in the data frame header. Subsequently, the network switch transmits the data from the port or ports connected to the destination network station or stations.

A single Ethernet network switch may have a number of 10/100 Mb/s ports, equaling, for example, 12 ports. The number of end stations connected to the single network switch is limited by the number of ports (i.e., port density) of the network switch. However, users of networking devices demand flexibility and scalability in their networks. To address this need, modular architectures have been developed that enable cascading of identical networking devices or network switch modules. By cascading these devices (or components) in a loop, port density can be readily increased without redesign or development of costly interfaces.

Unfortunately, as the number of cascaded switches increases, so does the system latency (i.e., the aggregate processing delay of the switches). System latency is attributable, in part, to the manner in which the switches store and retrieve the data frames in memory. One traditional memory architecture employs individual, local memories for each cascaded switch, as shown in FIG. 1. In this example, three multiport switches 12a 12b, 12c, are cascaded together to permit the exchange of data frames received by any one of the switches and subsequent forwarding of the data frames out of a different multiport switch. Each of these switches 12a 12b, and 12c has a memory interface, 44a, 44b, and 44c, respectively. These memory interfaces 44a, 44b, and 44c enable switches 12a 12b, and 12c to access their respective memories 601a, 601b, and 601c to write and read the data frames.

For explanation purposes, it is assumed that a data frame is received at a port (i.e., receive port) on switch 12a and that the data frame destination is a node attached to a port on a different switch 12c. Switch 12a first stores the received data frame in memory 601a, and then determines whether to forward the received data frame out of its own port or send it to the next switch in sequence. Because the data frame is not destined to any port of switch 12a, the data frame is retrieved from memory 601a and sent to the next switch 12b via the cascade port (i.e., the port to which the neighboring switches are connected) of switch 12a. Upon receiving the data frame, switch 12b stores the data frame in memory 601b. Switch 12b then examines the data frame and determines that it should be forwarded to switch 12c. Accordingly, switch 12b forwards the data frame to switch 12c by reading the stored received data frame from memory 601b and sending the data frame out its cascade port. When the data frame arrives at switch 12c. switch 12c writes the data frame into its memory 601c, in similar fashion as the other switches 12a and 12b. At this point, however, switch 12c determines that the data frame should be forwarded out one of its ports, which is connected to the destination node. Hence, switch 12c reads the stored data frame and forwards it out the appropriate port. As evident by this example, the data frame, as it is transferred from switch to switch is stored and read numerous times into the memories of the respective switches. The series of write and read operations disadvantageously imposes costly delay in the switching system.

To address this latency problem, one conventional approach is to employ a common memory among the various switches. FIG. 2 illustrates such a system in which switches 12a, 12b, and 12c share memory 701 via memory interfaces 44a, 44b, and 44c, respectively. Under this approach, the interfaces 44a, 44b, and 44c are required to have a wider data bus to maintain the speed of read and write accesses as compared to the individual memory arrangement of FIG. 8. For example, the bus width of the memory interfaces 44a, 44b, and 44c may need to increase to 128 bits. The main drawback with this common memory implementation is that the increase in memory bandwidth also results in a proportionate increase in the pin count. An increase in the number of pins disadvantageously requires more area on the circuit board, resulting in greater package cost.

SUMMARY OF THE INVENTION

There is a need for an arrangement to connect two or more multiport network switches together to increase port density, without increasing the memory bandwidth and a corresponding proportionate increase in pin count.

This and other needs are met by embodiments of the present invention which provides a multiport network switch arrangement having a plurality of multiport network switches each having a corresponding local buffer memory. The network switches in the arrangement are configured to segment each data frame received at an input port equal unitary segments so that data frames may be divided and stored equally among the local buffer memories, thus, in essence, creating a "shared memory" arrangement.

One aspect of the present invention provides a network switch arrangement having a plurality of multiport network switches. Included in the arrangement is a plurality of local buffer memories, each of the plurality of local buffer memories being coupled with a corresponding multiport network switch. A unidirectional data bus ring is connected to each of the plurality of network switches such that the switches are connected to each other in a concatenated fashion by the data bus ring. In this arrangement, a received data frame is segmented into equal length segments by a particular multiport network switch receiving the data frame. The particular switch transmits at least one of the equal length segments to at least one other multiport network switch over the unidirectional data bus ring for storage in the local buffer memory of the at least one other multiport network switch.

Transmitting at least some of the data frame segments to other network switches allows the storage of data frame to be distributed equally over all the local buffer memories. Hence, the bandwidth required for each local buffer memory is minimized.

Another aspect of the invention provides a method for receiving and transmitting data frames in a network switch arrangement. The method includes receiving a data frame at a first switch of a plurality of switches. The data frame is segmented as it is being received into a plurality of equal unitary segments. A first segment of the plurality of equal unitary segments is held in the first switch of the plurality of switches during a first time slot. A second segment is transferred to a second switch of the plurality of switches via a unidirectional bus ring connecting the plurality of switches and the second segment is then held in the second switch during a second time slot. During a third time slot, the second segment is transferred to a third switch of the plurality of switches via the bus ring, a third segment is transferred to the second switch via the bus ring and held in the first switch during the third time slot. At the end of the third time slot, each of the first, second and third segments is then stored in a respective memory corresponding to each of the plurality of switches at an end of the third time slot.

The above method serves to distribute the segments of a data frame between the memories of the switches. Hence, the method affords lower bandwidth requirements for each the switch memories.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral represent like elements throughout and wherein.

DETAILED DESCRIPTION OF PREFERRED EMBODIMENTS

Switch Architecture Overview

Figure 1:
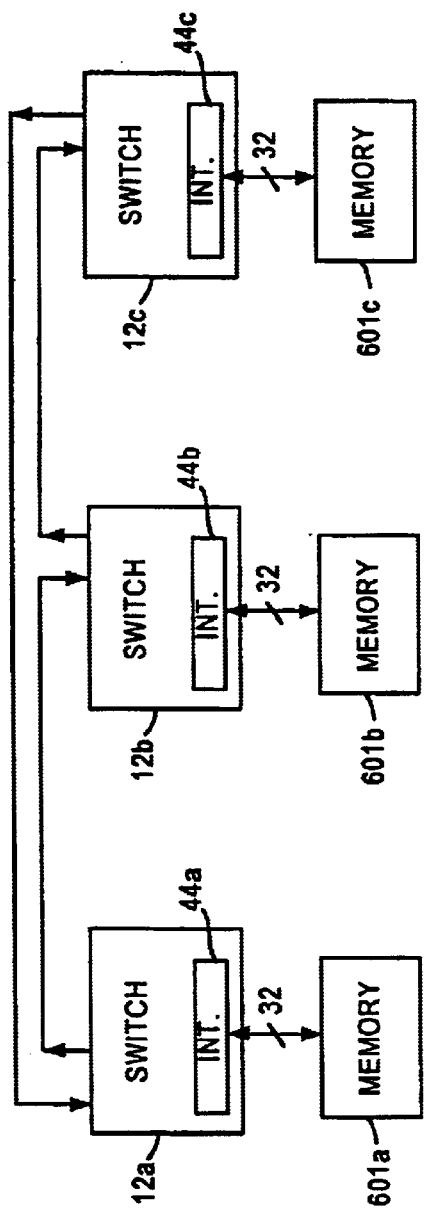
FIG. 1 is a block diagram illustrating a conventional switching arrangement that cascades multiple switch modules.
Figure 2:
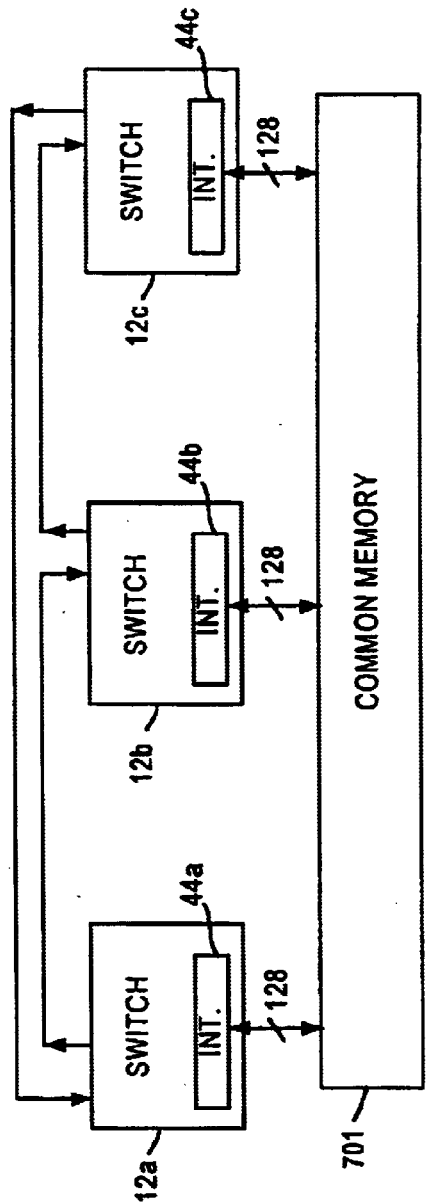
FIG. 2 is a diagram illustrating an alternative prior art arrangement using cascaded switching modules to store data frames in a common memory.
Figure 3:
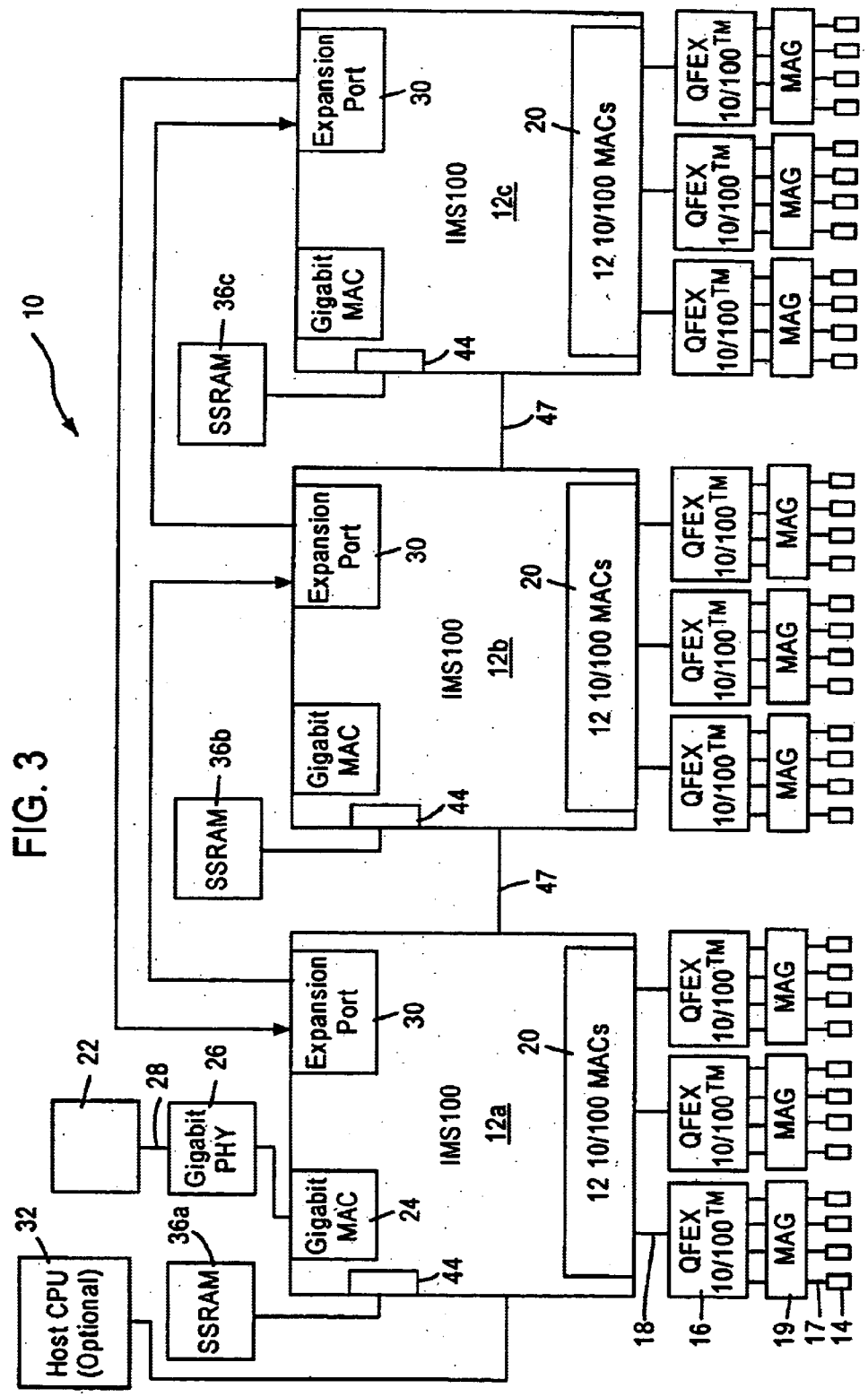
FIG. 3 is a diagram illustrating a switching system according to an embodiment of the present invention.

FIG. 3 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s,, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces (RMII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface device that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG) after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding reduced media independent interface (RMII) 18. In particular, each 10/100 PHY transceiver 16 is configured for sending and receiving data packets between the multiport switch 12 and up to four (4) network stations 14 via the RMII 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network.

Shared Memory Single Ring Architecture

The present invention is directed to a network switch arrangement that has the capability to minimize the required memory bandwidth. Multiple network switches are connected in a concatenated sequence (i.e., "daisy chained") via a single ring architecture. This architecture advantageously permits the sharing of memories across multiple switches, thereby minimizing the requisite memory bandwidth. Another advantage of this architecture is that it requires only a single memory access for writing data to the memory and a single memory access for reading data from the memory.

Figure 4:
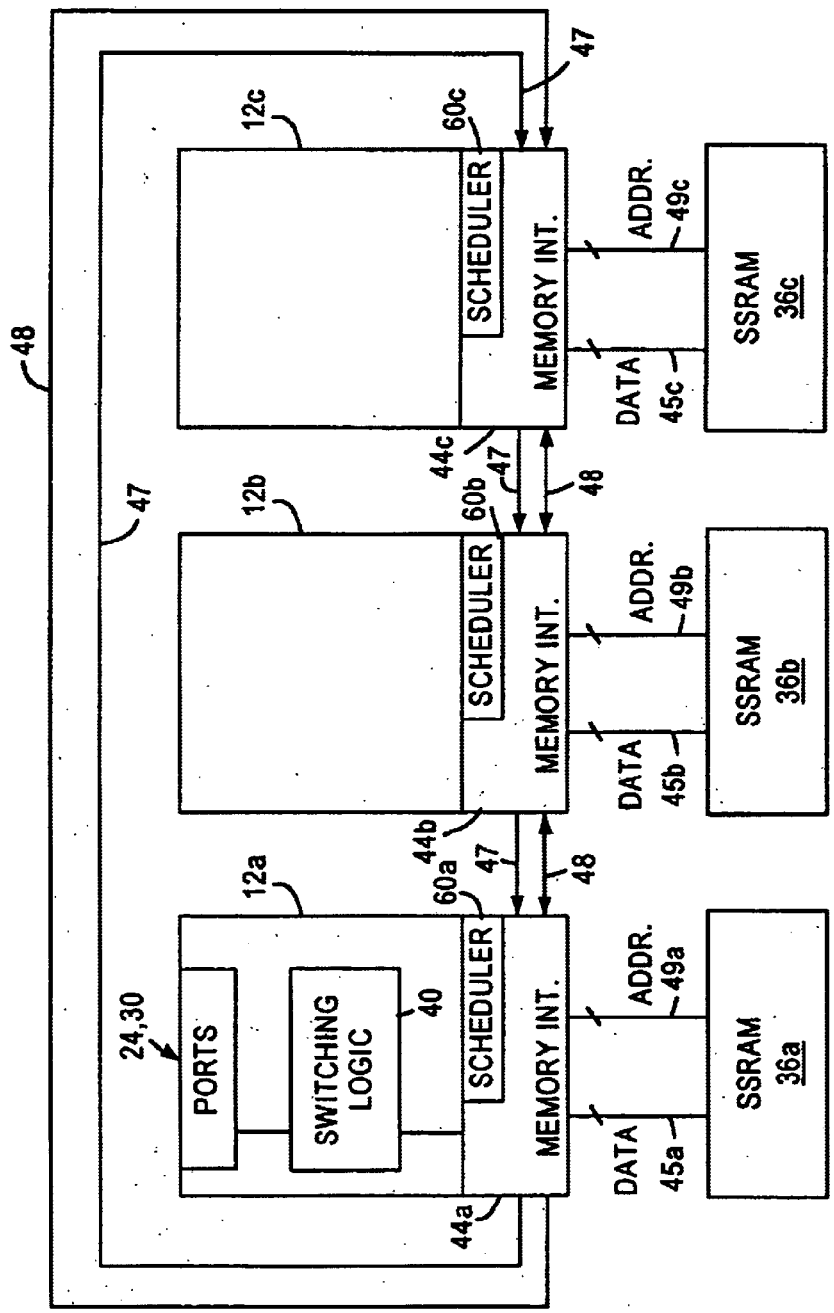
FIG. 4 is a block diagram in further detail the switching system of FIG. 3 including the memory interface.

FIG. 4 is a block diagram of the switching system of FIG. 3 in further detail according to an embodiment of the present invention. As shown in FIG. 4, each multiport switch module 12 includes a memory interface 44 for dividing a frame into equal segments, or data units, and outputting the segments of the received data frame as data units either onto a data bus 45 to the local buffer memory (i.e., SSRAM 36) or onto a unidirectional data bus ring 47 for transfer of the data units to another buffer memory 36 in a single direction (e.g., a clockwise direction as indicated by the arrows in FIG. 4). Preferably, the unidirectional data bus 45 is comprised of a 64-bit data bus running at 100 MHz.

Each of the switches 12 has a corresponding local buffer memory 36 configured for storing data units of data frames received from each of the multiport switch modules. For example, SSRAM 36a is configured for receiving frame data as data units for data frames received by each of the switch modules 12a, 12b, and 12c. Each memory interface 44 of FIG. 4 is configured for holding and transferring data units of frame data either to the corresponding buffer memory 36, or to another one of the memory interfaces 44 via the unidirectional data bus ring 47 for transfer to another local buffer memory 36.

Additionally, each of the memory interfaces 44 includes a scheduler 60. The scheduler 60 controls the writing and reading of data units between the plurality of local buffer memories 36 according to a prescribed access protocol, described in detail below with respect to FIG. 6. In particular, each scheduler 60 effects a prescribed protocol that determines whether a given data unit should be transferred to the corresponding memory 36, or should be transferred to another memory interface 44.

In order to communicate the buffer address locations within the arrangement, an address bus ring 48 allows the memory interfaces 44 to communicate memory locations to each other. In addition, an address bus 49 is located between each memory interface 44 and each SSRAM 36 so that the memory interface may communicate the buffer address location of data frame segments when they are either being written in or retrieved from the local buffer memory 36. Preferably, the address bus is an 18-bit address bus running at 100 MHz.

Figure 5:
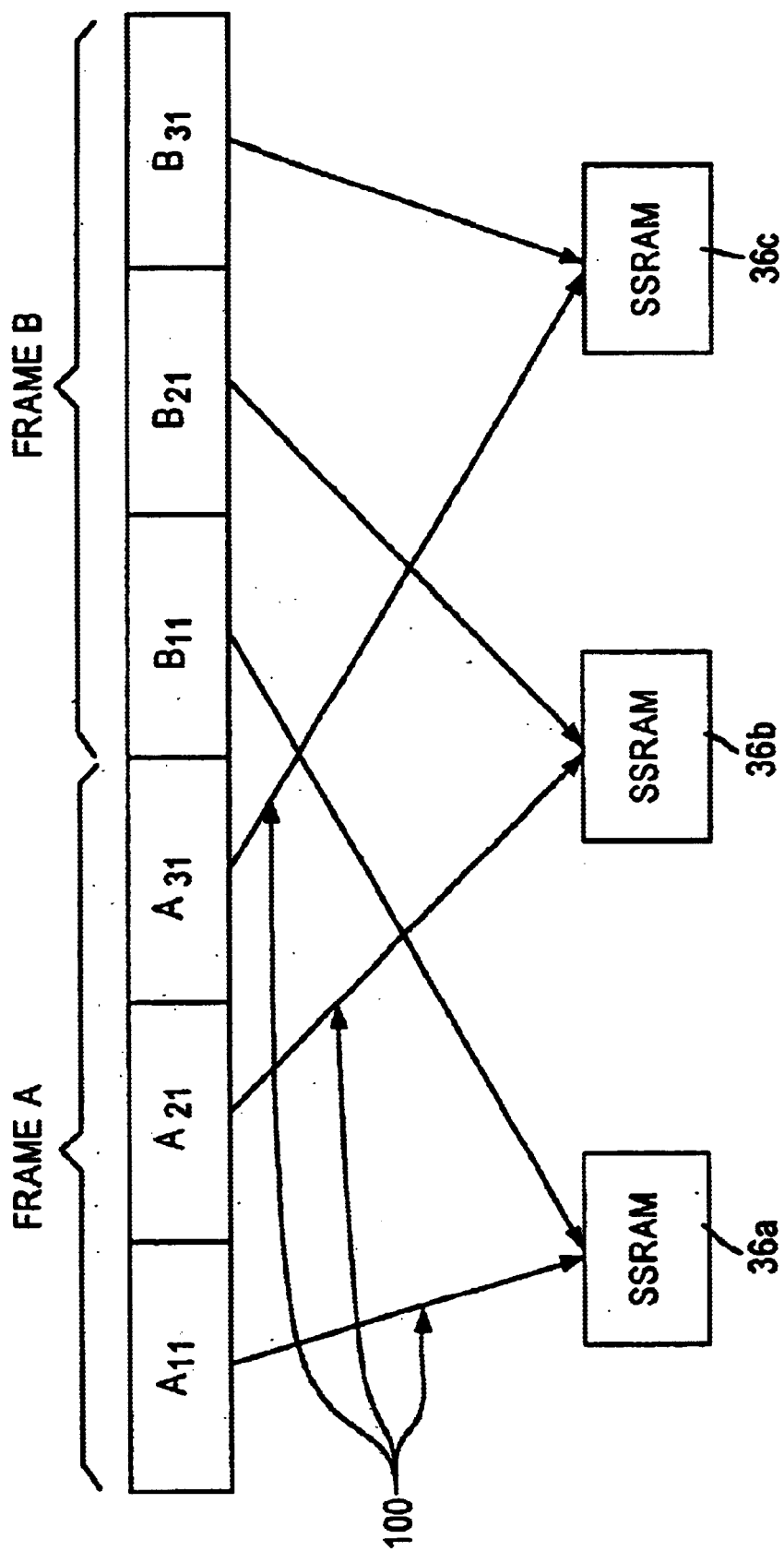
FIG. 5 is a diagram illustrating a prescribed memory access protocol used by the memory interfaces according to an embodiment of the present invention.

Preferably, each data frame received by a network switch 12 is segmented into data units of equal length. Additionally, the number of data units corresponding to each received data frame is equal to the number of network switches in the arrangement (e.g., three in the arrangement shown in FIG. 4 corresponding to the three network switches 36a, b & c). As an illustration, FIG. 5 shows a data frame that is divided into three equal segments. In a preferred embodiment, the segment lengths are a predetermined length, irrespective of the length of the received frame and are determined, for example, by dividing the maximum frame length (e.g., 1526 bytes under IEEE 802.3 Packet Format) by the number of segments (i.e., 3 in a preferred embodiment). Hence, if a data frame is received that is less than the maximum frame length, the memory interface 44 continues to create segments length according to the predetermined length. The remaining segments are filled by "dummy" segments (e.g., $B_{XX}$) so that the number of segments remains the same for each data frame as illustrated in FIG. 5.

As an example of the operation of a preferred network switch arrangement, a data frame A is assumed to be received by the memory interface 44a from the ports (i.e., 24 and 30) in switch 12a during a first time slot. After receiving data frame A, the memory interface 44a divides the frame into three equal segments (i.e., $A_{11}, A_{21}, \& A_{31}$) during a first time slot 1. The scheduler 60a designates that the first unit $A_{11}$ of the equal length segments is allocated for storage in local buffer memory 36a and causes the first unit $A_{11}$ to be held by temporary buffer (not shown) in the memory interface 44a at the end of the first time slot as shown in FIG. 5. During a second consecutive time slot 2, the scheduler 60a directs the memory interface 44a to transfer the second unit $A_{12}$ of the data frame to switch 12c over the unidirectional bus ring 47. The memory interface 44c of switch 12c receives and holds the second unit $A_{21}$ in a temporary buffer (not shown) during time slot 2. Simultaneously, the scheduler 60 determines and transmits the memory address for frame A to the memory interface 44c.

During a third consecutive time slot 3, memory interface 44a transfers the third data unit $A_{31}$ via the unidirectional bus ring 47 to the memory interface 44c in switch 12c. The memory interface 44c also transfers the second data unit $A_{21}$, which was being temporarily held by the temporary buffer in interface 44c, to memory interface 44b of switch 12b. At the end of the time slot 3, each of the memory interfaces 44 write the segments that they are currently holding into their corresponding local buffer memory 36 according to the prescribed protocol at an address location communicated over the address bus 49 by memory interface 44a. As illustrated in FIG. 5, arrows 100 indicate the transference of the segments to the local buffer memories for a data frame received at switch 12a.

Figure 6:
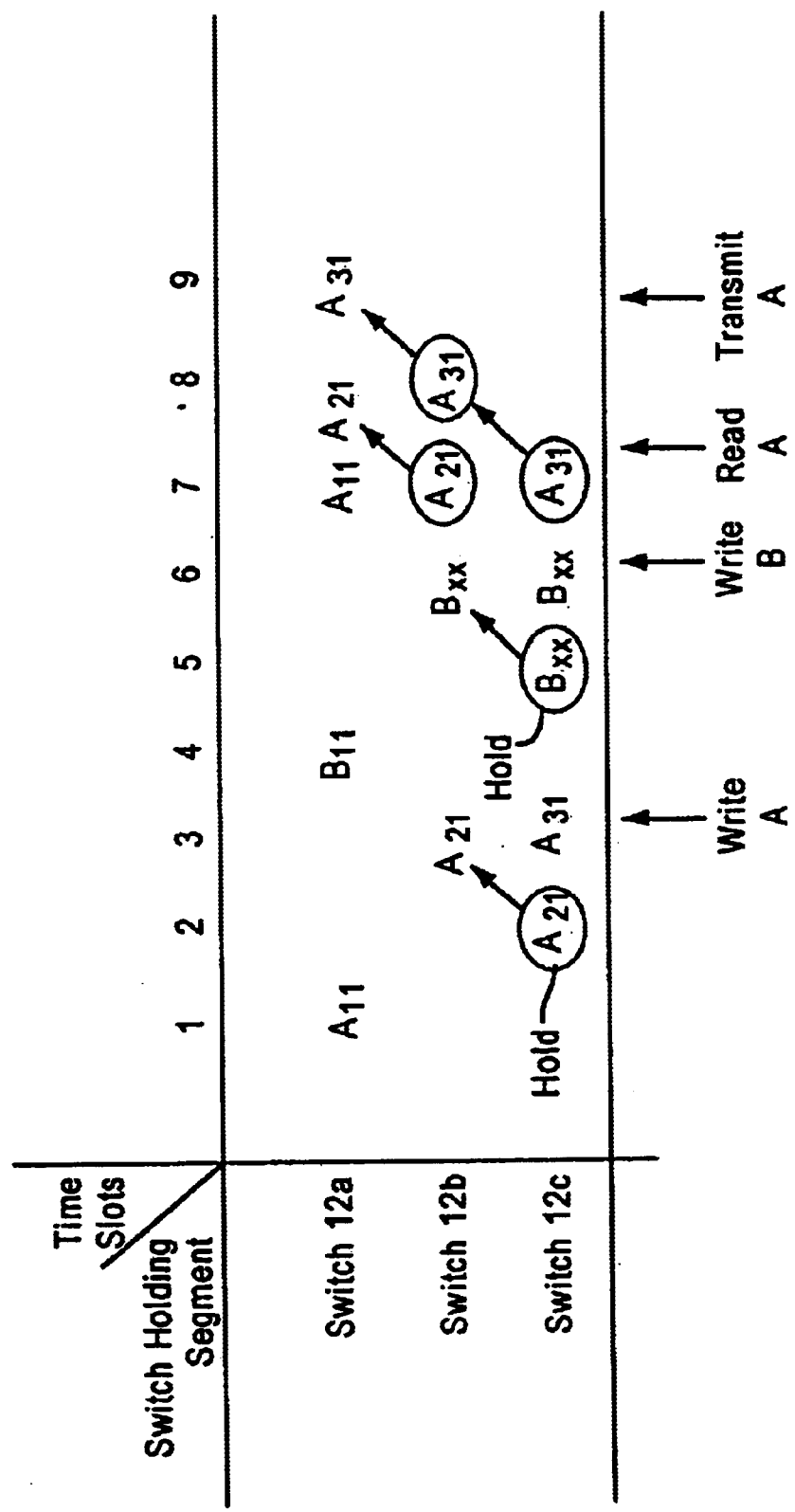
FIG. 6 is a diagram illustrating the transfer of data segments to different buffers according to the prescribed memory access protocol.

When a data frame is retrieved from the local buffer memories 36, each of the memory interfaces 44 retrieves the corresponding data segment from its corresponding local buffer memory 36. The location of the segments is delineated by an address location transmitted by one of the memory interfaces 44 to the other interfaces. Using the example discussed above, if switch 12a is going to transmit Frame A over one of its ports 24, an address location for a frame is transmitted by memory interface 44a to the other memory interfaces 44b and 44c over the address bus 48. According to the prescribed protocol, each of the memory interfaces accesses the addressed memory location within its respective local buffer memory 36 and reads the data contained therein into the memory interface 44 during a time slot 7 as shown in FIG. 6. Since the transmitting switch 12a already contains the first data segment $A_{11}$, this segment is held by its memory interface 44a during subsequent time slots 8 and 9. During the next time slot 8, the memory interface 44b transmits the data segment $A_{21}$ to memory interface 44a over data bus ring 47 where it is held for re-assembly of the frame. Simultaneously, memory interface 44c transmits data segment $A_{31}$ to memory interface 44b. At time slot 9, the data segment $A_{31}$ is transferred by memory interface 44b to memory interface 44a. Finally, at the end of time slot 9, the frame A is re-assembled and transmitted to the ports 24 for transmission over the network.

The foregoing arrangement of the present invention affords the system with only one read and one write access requirement per data frame. Thus, the memory bandwidth of the SSRAM and the data bus ring can be maximized, without an increase in bandwidth. For example, a preferred embodiment of the present system only requires a 64-bit wide SSRAM and data bus.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A network switch arrangement comprising:
    a plurality of multiport network switches;
    a plurality of local buffer memories, each of the plurality of local buffer memories being coupled with a corresponding multiport network switch; and
    a unidirectional data bus ring connecting the plurality of network switches in a concatenated sequence, each multiport network switch configured for segmenting a corresponding received data frame into equal length segments and transferring at least one of the equal length segments to at least another one of the multiport network switches over the unidirectional data bus ring for storage in the local buffer memory of the at least another one of the multiport network switches.

2. The network switch arrangement of claim 1, further comprising:
    each of the plurality of network switches having a corresponding external memory interface configured for connecting each corresponding network switch to the unidirectional data bus ring, each external memory interface also configured to read and write segments to each local buffer memory associated with a corresponding network switch.

3. The network switch arrangement of claim 1, further comprising:
    an address bus connecting each of the plurality of network switches, the address bus configured for transmitting a memory address location that points to a particular memory location within each of the plurality of local buffer memories.

4. The network switch arrangement of claim 3, wherein the address bus is configured to transmit the memory address location pointer for at least one of the purpose of retrieving and storing the equal length segments within the local buffer memories.

5. The network switch arrangement of claim 1, wherein the network switches are configured to each hold and transmit a segment of the data frame during consecutive time slots, wherein transmission is made.

6. The network switch arrangement of claim 1, wherein the unidirectional data bus ring is a 64-bit data bus.

7. The network switch arrangement of claim 1, wherein the unidirectional data bus ring operates at a clock speed of 100 MHz.

8. The network switch arrangement of claim 3, wherein the address bus is an 18-bit data bus.

9. The network switch arrangement of claim 1, further comprising:
    each of the plurality of network switches having a scheduler configured for controlling the transmission of equal length segments to other of the plurality of network switches over the unidirectional data bus ring according to a prescribed protocol and also configured for controlling the reading and writing of data segments in the respective local buffer memories;
    wherein the scheduler directs segments to be held within the respective network switch and directs segments to be transmitted over the unidirectional data bus during prescribed time slots determined according to the prescribed protocol; and wherein the scheduler also directs the writing and reading of segments to and from local buffer memories according to the prescribed protocol.

10. A method for receiving and transmitting data frames comprising the steps of:
    receiving a data frame at a first switch of a plurality of switches;
    segmenting the data frame as it is being received into a plurality of equal data segments;
    holding a first data segment of the plurality of equal data segments in the first switch of the plurality of switches during a first time slot;
    transferring a second data segment to a second switch of the plurality of switches via a unidirectional bus ring connecting the plurality of switches and holding the second data segment in the second switch during a second time slot;
    transferring the second data segment to a third switch of the plurality of switches via the bus ring, transferring a third data segment to the second switch via the bus ring and holding the third data segment in the first switch during the third time slot; and
    storing the first, second and third data segments in memory devices coupled to the plurality of switches, respectively, at an end of the third time slot.

11. The method of claim 10, further comprising the steps of:
    retrieving the plurality of equal unitary segments out of the respective memory devices during a fourth time slot;
    transmitting all of the retrieved unitary segments which comprise the data frame to one or more of the plurality of switches according to a prescribed protocol via the unidirectional bus during subsequent consecutive time slots after the fourth time slot; and
    transferring all of the segments within the one or more of the plurality of switches to ports within the switches for transmission over a network.

12. A method for receiving and storing data frames comprising the steps of:
    (a) receiving a data frame at a network switch connected to a data bus ring;
    (b) dividing the data frame into a plurality of equal data segments;
    (c) determining, according to a prescribed protocol, for each of the plurality of data segments whether the data segment is to be held within the network switch or transferred to one or more other network switches connected to the data bus ring;
    (d) transmitting data segments that have been determined for transfer in step (c) to the one or more other network switches; and
    (e) simultaneously storing all of the plurality of data segments in local buffer memories corresponding to each of the network switches.

* * * * *